Figure 1:
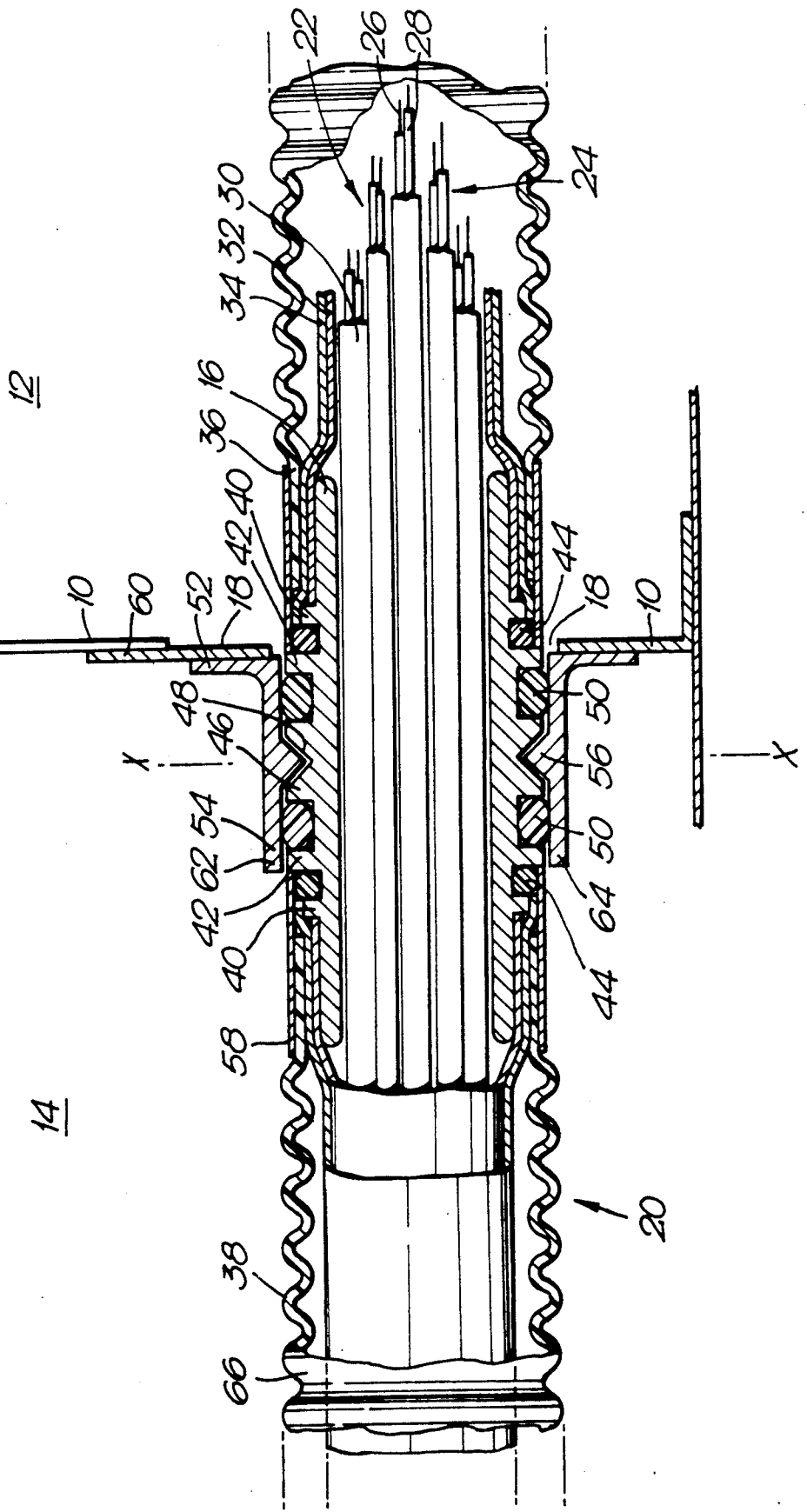

United States Patent [19]

Clifford

[11] Patent Number: 5,091,605
[45] Date of Patent: Feb. 25, 1992

[54] FIRE-PROOF SEALS

[75] Inventor: Paul Clifford, Leighton Buzzard, England

[73] Assignee: Rolls-Royce plc, London, England

[21] Appl. No.: 470,727

[22] Filed: Jan. 26, 1990

[30] Foreign Application Priority Data

Feb. 8, 1989 [GB] United Kingdom ............... 8902796

[51] Int. Cl.⁵ ............................................. H02G 3/22
[52] U.S. Cl. ................................. 174/65 R; 174/151
[58] Field of Search ............ 174/65 R, 55, 151, 88 C, 174/89

[56] References Cited

U.S. PATENT DOCUMENTS

| 3,830,957 | 8/1974 | Oberdiear | 174/65 SS X |
| 3,895,177 | 7/1975 | Muslin | 174/65 R X |
| 4,088,381 | 5/1978 | Harnett | 174/151 X |

FOREIGN PATENT DOCUMENTS

| 245819 | 6/1960 | Australia | 174/89 |
| 3028800 | 2/1982 | Fed. Rep. of Germany | 174/65 R |
| 3111163 | 10/1982 | Fed. Rep. of Germany | |
| 677656 | 8/1952 | United Kingdom | |
| 904673 | 8/1962 | United Kingdom | |
| 993282 | 5/1965 | United Kingdom | |
| 1163167 | 9/1969 | United Kingdom | |
| 1178579 | 1/1970 | United Kingdom | |

*Primary Examiner*—Leo P. Picard
*Assistant Examiner*—David A. Tone
*Attorney, Agent, or Firm*—Oliff & Berridge

[57] ABSTRACT

A fire-proof seal for a tubular conduit (16) of thermally conductive material adapted to contain an elongate member (24) extending axially outside the conduit, the seal comprising a thermally conductive sleeve (34) surrounding the member externally of the conduit and in thermal contact with an external flange (40) of the conduit, and a thermally fusible material (30) surrounding the member within the conduit, whereby, in the event of a fire in the vicinity of the member externally of the conduit, heat is transmitted through the sleeve into the conduit so as to fuse the thermally fusible material and block the interior of the conduit.

5 Claims, 1 Drawing Sheet

FIRE-PROOF SEALS

This invention concerns improvements in or relating to fire-proof seals In particular, it concerns a seal in a fire wall or bulkhead through which one or more electrical conductors, such as an electrical power cable or a computer cable, passes.

It is common practice to monitor the performance of an engine, such as a gas turbine engine or an internal combustion engine, by measuring various engine performance parameters and passing the data so acquired via electrical conductors to a computer for subsequent analysis, or to enable the engine to be controlled on-line by the computer.

An engine using a flammable fuel is a potential fire hazard, and it is therefore customary to isolate the engine from the computer installation by means of a fire wall or fire-proof bulkhead. The problem then arises how to pass the computer cables from the engine to the computer safely and securely through the bulkhead. One way in which this may be done is by providing a multi-pin plug and socket assembly in the bulkhead and connecting computer cables from the engine and the computer to either side of the multi-pin plug and socket assembly. A disadvantage of this arrangement is that a multi-pin plug and socket assembly can be a source of data corruption, especially when located in an engine bulkhead which is subjected to heat and vibration, and possible contamination from fuel, oil or other fluids. Further disadvantages of a multi-pin plug and socket assembly are that the pins can easily be damaged when the assembly is being plugged or unplugged, and that the overall weight of the engine and its installation is increased. However, there are commercially available connectors which have been specifically designed for use in firewalls for aero application which have been designated as being fireproof as defined by the appropriate certifying authority i.e. The Civil Aviation Authority (CAA).

Alternatively, the computer cables may be passed through an aperture in, or a conduit through, the bulkhead. This arrangement maintains the integrity of the cables between engine and computer, thus minimising corruption of transmitted data, but any such arrangement must meet the fire-proof criteria as specified by the appropriate regulatory body, such as the CAA.

It is an object of the present invention to provide a means of connecting the transducers on the engine to the computer via uninterrupted cables which pass through a conduit which in the event of a fire maintain the integrity of the firewall through which the cables pass.

According to a first aspect of the invention there is provided a conduit for channelling an electrical cable through an aperture in a partition, the cable being of the type consisting of a conductive core enclosed in a fusible thermoplastic insulating sleeve, the insulating sleeve being enclosed in a wear-resistant sleeve, and the wear-resistant sleeve being enclosed in a braided metal sleeve, the conduit comprising a cylindrical metal tube having a first upstanding circumferential portion distal from an end, and a second circumferential portion between the first circumferential portion and said end, wherein, in use, (a) the wear-resistant sleeve is in facing contact with the second circumferential portion of the tube, (b) the braided metal sleeve is in thermal contact with the first circumferential portion, and (c) the conductive core together with the fusible thermoplastic insulating sleeve extends through the tube, whereby, in the event of a fire in the vicinity of the cable outside of the conduit, heat is conducted from the braided metal sleeve through the wall of the conduit at the first circumferential portion to the fusible thermoplastic insulating sleeve within the conduit so as to fuse the fusible sleeve and block the conduit.

According to a second aspect of the present invention there is provided a fire-proof seal for a tubular conduit of thermally conductive material adapted to contain an elongate member extending axially outside the conduit, the seal comprising a thermally conductive sleeve surrounding the member externally of the conduit and in thermal contact with the outside of the conduit, and a thermally fusible material surrounding the member within the conduit, whereby, in the event of a fire in the vicinity of the member externally of the conduit, heat is transmitted through the sleeve into the conduit so as to fuse the thermally fusible material and block the interior of the conduit.

The invention will now be described by way of example only with reference to the accompanying non-scale diagrammatic drawing which shows a longitudinal section along the axis of a tubular cable conduit and fire wall, together with a multi-core cable.

Referring to the drawing FIG. 1 there is shown a titanium fire wall or bulkhead 10 separating an aircraft engine compartment 12 from the remainder 14 of the installation; a tubular titanium cable conduit 16 passing from one side of the fire wall to the other through an aperture 18 in the fire wall; and a multicore electrical cable 20, which may, for example, be a multi-pin computer cable.

The cable 20 comprises, reading from the interior outwards: a bundle 22 of sets 24 of conductors 26, each conductor in a set being individually encased in a sleeve 28 of electrically insulating material, and each set being encased in an electrically insulating sleeve 30 made of a fusible thermoplastic such as polyimide resin; a sleeve 32 of wear-resistant material encasing the bundle 22; a sleeve 34 of nickel-plated copper braid encasing the sleeve 32; and an outermost protective sleeve 36 made of polytetrafluoroethylene. The sleeve 36 may be corrugated, as shown by feature 38 of the drawing.

As stated above, the conduit 16 is of tubular construction, and, as illustrated, is symmetric about a median line X—X at right angles to its longitudinal axis. The conduit 16 is provided with a first pair of upstanding circumferential flanges 40 disposed symmetrically about the median line X—X and each spaced from a respective end of the conduit. The conduit 16 is further provided with a second pair of upstanding circumferential flanges 42 also symmetrically disposed about the median line X—X and each located between an adjacent respective first flange 40 and the median line X-X. Each flange 42 stands higher above the surface of the conduit 16 than does its adjacent respective flange 40 by at least the thickness of the copper braid 34. Located between each flange pair 40, 42 is an O-ring 44 of polymeric material, which provides sealing against moisture.

Located between flanges 42 and extending symmetrically either side of the median line X—X is an upstanding circumferential middle flange 46 provided on the median line with a circumferential V-section channel 48 which, as will be explained infra, is used as part of a securing arrangement for the assembly. A pair of O-ring seals 50, made of an elastomeric polymer, is provided, each O-ring 50 being located between the flange 46 and a respective one of flanges 42.

Bolted to the firewall 10 is removable section of firewall 60 onto which is permanently secured the upper half of housing 62 which comprises annular titanium flange 52 and cylindrical titanium sleeve 54. Permanently secured to firewall 10 is lower housing 64 which comprises annular flange 52 and sleeve 54. Upper 62 and lower 64 housings are secured together by means of two bolts which are captive in upper housing 62. To enable removal of cable assembly 66 removable section of firewall 60 is unbolted from firewall 10 and lower housing 64 removed. Cable assembly 66 is then disengaged from lower housing 64 and moved along aperture 18 to the edge of the firewall 10. Assembly is made in a reverse manner. The sleeve 54 is provided on its inner surface with a radially inwardly extending annular flange 56 of V-shaped channel 48 in the middle flange 46 of the conduit 16. The length of the sleeve 54 is at least the distance between each of the second pair of flanges 42 on the conduit 16, so that the sleeve covers both flanges; and the V-shaped annular flange 56 is located within the sleeve so that, when the sleeve covers both flanges 42, the V-shaped flange 56 engages the V-section channel 48 in the flange 46 of the conduit. When the V-shaped flange 56 and the V-section channel 48 so engage, the sleeve 54 encloses the O-ring seals 50 within their respective channels between the second pair of flanges 42 and the middle flange 46 of the conduit 16. The principal purpose of O-ring seals 50 is to provide an anti-vibration mounting and minimise fretting between the conduit 16 and the sleeve 54.

When the cable 20 is assembled in the conduit 16 the bundle 22 of sets of conductors is passed through the conduit 16 which is retained in the titanium sleeve 54 by means of the inter-engaging V-shaped flange 56 and V-section channel 48. The bundle 22 typically fills about 95% of the space within the conduit 16. The sleeves 32, 34 and 36 enclosing the bundle 22 are cut so that, at each end of the conduit: sleeve 32 of wear-resistant material overlaps the conduit 16 from the end of the conduit to flange 40; sleeve 34 of nickel-plated copper braid overlaps sleeve 32 onto the radially outermost surface of flange 40 and in contact with that surface; and the outermost sleeve 36 of polytetrafluororethylene overlaps sleeve 34 to, but not onto, flange 40. The three sleeves 32, 34, and 36 are retained firmly in position on the conduit 16 by means of a swaged stainless steel band 58 which extends from the end of the conduit to the second flange 42 so as to hold the end of sleeve 34 in firm thermal contact with flange 40 and to enclose the O-ring seal 44 between flanges 40 and 42.

In operation of the invention, if a fire should break out in the engine compartment 12 heat is conducted along the copper braid sleeve 34 to its thermal contact with flange 40 and is dissipated primarily by means of the copper braid 34. The copper braid 34 acts as a heat sink for a period of time. Should the copper braid melt, exposing the bundle of conductors 22, the path of the fire from the engine compartment 12 to the remainder of the installation 14 is blocked by the bundle of conductors 22. For the fire to manifest itself outside the engine compartment in the remainder of the installation 14, it must travel the length of the conduit 16 and burn through the second copper braid 34. As previously stated, the certifying authority considers that, in general terms, any device which prevents the passage of fire for a period of fifteen minutes is designated as being fire proof. It is also found that although the heat may fuse or carbonize the polymeric O-ring seals 50 the seals, being contained in air-tight channels, retain their sealing capability and resist the passage of hot gases through that route.

Alternative materials, other than those exemplified, may be used in the invention. For instance, the swaged band 58 may be made of titanium.

I claim:

1. A conduit in combination with an electrical cable for channelling the electrical cable through an aperture in a partition, the cable being of the type consisting of a conductive core enclosed in a fusible thermoplastic insulating sleeve, the insulating sleeve being closed in a wear-resistant sleeve, and the wear-resistant sleeve being enclosed in a braided metal sleeve, the conduit comprising:

a cylindrical metal tube having a wall with an upstanding circumferential portion distal from an end of the tube, a portion of the tube extending between the upstanding circumferential portion and said end of the tube defining a surface in facing contact with the wear-resistant sleeve, the upstanding circumferential portion defines a thermal contact surface with the braided metal sleeve to conduct heat from the braided metal sleeve through the wall of the conduit at the upstanding circumferential portion to the fusible thermoplastic insulating sleeve within the conduit so as to fuse the fusible sleeve and block the conduit.

2. The combination as claimed in further comprising securing means for enabling the conduit to be secured to the partition.

3. The combination as claimed in claim 2 wherein the securing means is an annular flange portion of the tube provided with a circumferential channel adapted to engage with a corresponding radially inwardly projecting portion of a cylinder attached to the partition and surrounding and coaxial with the aperture in the partition.

4. The combination as claimed in claim 1 further comprising means to for retaining the braided metal sleeve in thermal contact with the upstanding circumferential portion.

5. The combination as claimed in claim 4 wherein the retaining means is a circumferential band.

* * * * *